United States Patent
Müller

[19]

[11] Patent Number: 5,774,226
[45] Date of Patent: Jun. 30, 1998

[54] METHOD OF SCANNING REGISTER MARKS PRODUCED IN MULTICOLOR PRINTING

[75] Inventor: Tobias Müller, Hirschberg, Germany

[73] Assignee: Heidelberger Druckmaschinen AG, Heidelberg, Germany

[21] Appl. No.: 375,966

[22] Filed: Jan. 20, 1995

[30] Foreign Application Priority Data

Jan. 20, 1994 [DE] Germany ............... 44 01 535.6

[51] Int. Cl.⁶ .................................. G01N 21/25
[52] U.S. Cl. ............................. 356/418; 356/402
[58] Field of Search ................. 356/418, 402–411, 356/36, 375, 398–401

[56] References Cited

U.S. PATENT DOCUMENTS

| | | | |
|---|---|---|---|
| 4,783,166 | 11/1988 | Stern | 356/402 X |
| 4,963,029 | 10/1990 | Kipphan | 356/401 |
| 4,991,970 | 2/1991 | Darboux et al. | 356/402 |
| 5,247,462 | 9/1993 | Blasius et al. | 356/401 X |

Primary Examiner—K. Hantis
Attorney, Agent, or Firm—Herbert L. Lerner; Laurence A. Greenberg

[57] ABSTRACT

Method of scanning register marks produced in multicolor printing which includes generating signals by means of at least one photoelectric receiver from register marks which are applied, respectively, in one color, in a register mark track on a print carrier transportable past the receiver, the register marks differing sharply in contrast with the ink on the ink carrier, determining in a circuit arrangement amplitudes of the signals from the register marks, and bringing a filter arrangement into a radiation path between a light source and the receiver for contrast matching, further includes automatically bringing one defined color filter of the filter arrangement into the radiation path and, after scanning at least one group of register marks wherein all of the colors present in the print are contained, determining a scattering of intensity maxima of the signals generated from the register marks of the one group of register marks, the defined color filter automatically brought into the radiation path having a capability of producing a minimal scattering of the intensity maxima of signals generated by scanning register marks of at least another group of register marks succeeding the one group of register marks.

1 Claim, 2 Drawing Sheets

Fig.2
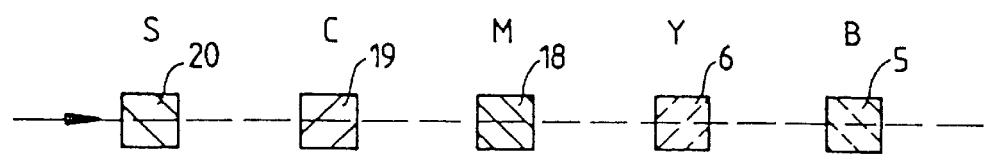
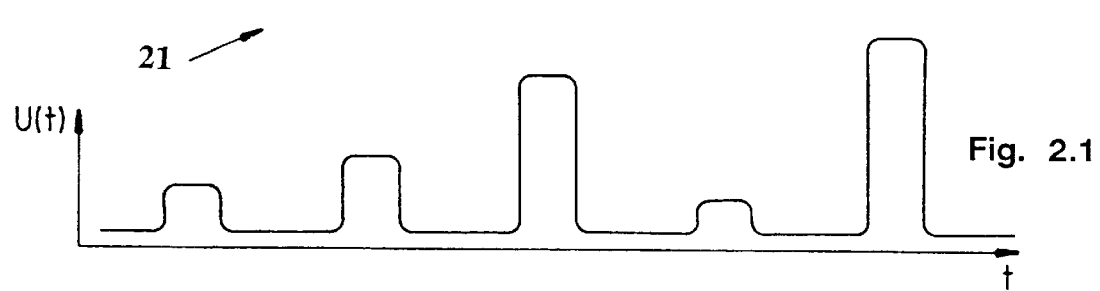
Fig. 2.1
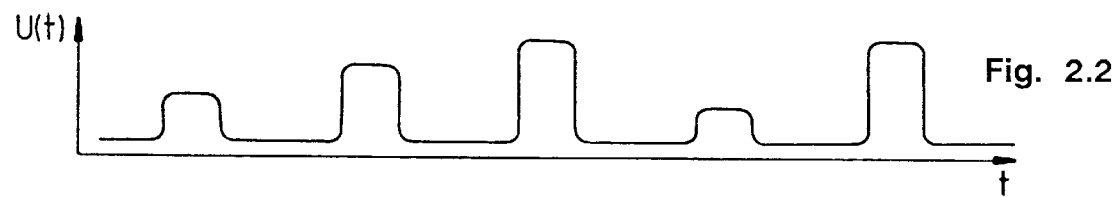
Fig. 2.2
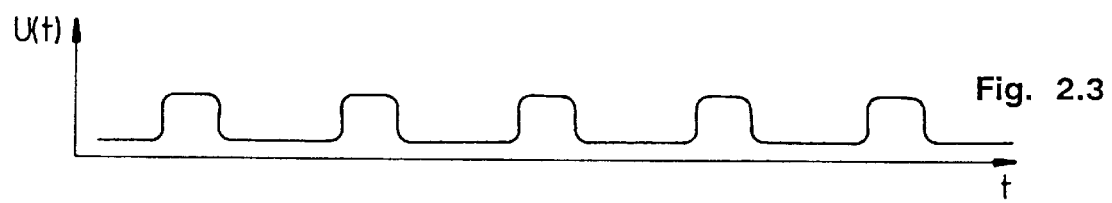
Fig. 2.3

5,774,226

METHOD OF SCANNING REGISTER MARKS PRODUCED IN MULTICOLOR PRINTING

BACKGROUND OF THE INVENTION:

FIELD OF THE INVENTION

The invention relates to a method of scanning register marks produced in multicolor printing which includes generating signals by means of at least one photoelectric receiver from register marks, which are applied, respectively, in one color, in a register mark track on a print carrier transportable past the receiver, the register marks differing sharply in contrast with the ink on the ink carrier, determining in a circuit arrangement amplitudes of the signals from the register marks, and bringing a filter arrangement into a radiation path between a light source and the receiver for contrast matching.

In heretofore known methods, a color filter has been provided in a lighting or illumination path or in a measuring or receiver radiation path, which is supposed to improve the recognizability of register marks which are poor in contrast. Such a filter is usually a blue filter for improving the contrast of yellow register marks. This filter is optimized for the case wherein the operation being performed is four-color printing using cyan, magenta, yellow and black as standard colors. In a multicolor printing operation, wherein other special colors are used besides the standard colors, the blue filter installed for the standard colors does not function optimally, because the register marks printed in the special colors produce a great deviation range in the signal amplitudes of the photoelectric register-mark sensors, which is disadvantageous to the accuracy with which the position of the register marks is determined.

It is possible to provide a filter optimal for printings in standard and special colors, which must then be brought, by itself or in addition to the aforementioned blue filter, into the path of the rays. The manual exchange of existing filters or the provision of additional individual color filters is costly in time as well as in money, all of the possible variations in the standard and special colors being unable to be taken into consideration.

It has been known heretofore, with regard to densitometers, to arrange a rotatable color filter wheel with discrete color filters in the receiver or detector radiation path. At the same measuring location, such a color filter is brought into the path of the rays, which generates similar gray value signals at a photoelectric receiver for various different colors which are to be analyzed. This method of color filter selection is not applicable to the scanning of register marks because, due to the moving print carrier, the measuring location is continually changing and the receiver signal for contrast measuring, i.e., for recognizing the limits of or boundaries between the respective register marks, is being evaluated.

SUMMARY OF THE INVENTION

It is accordingly an object of the invention to provide a method of scanning register marks produced in multicolor printing wherein color filters are changed, which permits an automatic matching of a filter arrangement to the colors used in the printing.

With the foregoing and other objects in view, there is provided, in accordance with the invention, a method of scanning register marks produced in multicolor printing which includes generating signals by means of at least one photo-electric receiver from register marks which are applied, in respective colors, in a register mark track on a print carrier transportable past the receiver, the register marks differing sharply in contrast with the ink on the ink carrier, determining in a circuit arrangement amplitudes of the signals from the register marks, and bringing a filter arrangement into a radiation path between a light source and the receiver for contrast matching, and which comprises automatically bringing one defined color filter of the filter arrangement into the radiation path and, after scanning at least one group of register marks wherein all of the colors present in the print are contained, determining a scattering of intensity maxima of the signals generated from the register marks of the one group of register marks, automatically bring another defined color filter of the filter arrangement into the radiation path and, after scanning at least one group of register marks wherein all of the colors present in the print are contained, determining a scattering of intensity Maxima of the signals generated from the register marks of the at least one group of register marks, the defined color filter automatically brought into the radiation path having a capability of producing a minimal scattering of the intensity maxima of signals generated by scanning register marks of at least another group of register marks succeeding the one group of register marks.

The filter arrangement may be formed of an arrangement of discrete filters provided on a filter wheel, or an arrangement of discrete filters inserted into a filter magazine. Likewise, a filter arrangement is usable which has a continually varying filtering characteristic.

Other features which are considered as characteristic for the invention are set forth in the appended claims.

Although the invention is illustrated and described herein as a method of scanning register marks produced in multicolor printing, it is nevertheless not intended to be limited to the details shown, since various modifications and changes may be made therein without departing from the spirit of the invention and within the scope and range of equivalents of the claims.

The method of operation of the invention, however, together with additional objects and advantages thereof will be best understood from the following description of specific embodiments when read in connection with the accompanying drawings, in which:

BRIEF DESCRIPTION OF THE DRAWING:

FIG. 2 is a diagrammatic view of a track of register marks; and

FIGS. 2.1, 2.2 and 2.3 are plot diagrams of the course or curve of signals at the output of a register mark sensor and shown keyed to the register marks of FIG. 2.

Figure 1:
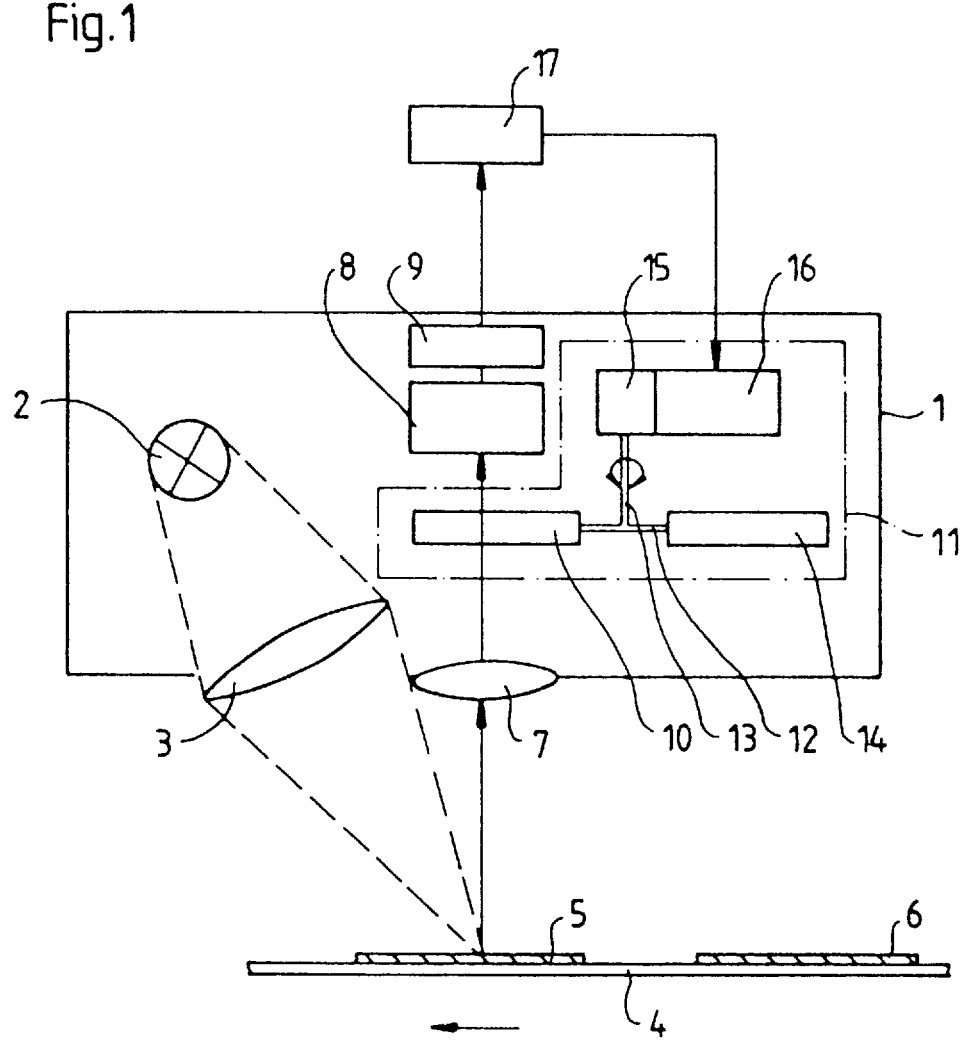
FIG. 1 is a diagrammatic and schematic view of a device for performing the scanning method according to the invention.

DESCRIPTION OF THE PREFERRED EMBODIMENTS:

Referring now to the drawing and, first, particularly to FIG. 1 thereof, there is shown therein an arrangement of components by means of which the method of scanning register marks produced in multicolor printing, in accordance with the invention, can be performed. The arrangement includes a register mark sensor 1 with a light source 2 and a lighting or illuminating optical system 3. With the aid of the lighting optical system 3, a measuring field which lies on a print carrier 4 in a register mark track with register marks 5 and 6 of varying colors is illuminated. The register mark sensor 1 further includes a receiver or detector optical system 7, a photoelectric receiver or detector 8, which may be any light detecting device allowing the detection of edges on print material, e.g., photo diodes, photo multipliers and photo-sensing devices, and a circuit 9 for preprocessing the signals of the receiver 8. The circuit 9 thus forms a signal-preprocessing unit for amplifying the signal coming from the photoelectric receiver 8, and may also include means for electronic edge sharpening or enhancement, such as differential amplifiers. A filter 10 and a filter-changing device 11 are located between the receiver optical system 7 and the receiver 8. The filter changing device 11 is made up of a filter wheel 12 with mutually, equally spaced-apart individual filters 10 and 14 arranged about a transmission shaft 13 coupled to transmission 15 which is connected to a drive 16. The drive 16 is controlled by a motor regulating or control circuit 17 which is connected to the signal-preprocessing circuit 9. The motor regulating control circuit 17 is thus an intelligent motor control unit for moving the filter-changing device 11 according to the edge sharpness signal. This intelligent unit 17 makes the decision, with the aid of conventional hardware and software, as to whether the selected filter is satisfactory for the desired edge sharpness or whether the filter has to be changed.

The operation of the device of FIG. 1 is apparent from the description hereinafter of FIGS. 2, 2.1, 2.2 and 2.3: Light from differently colored register marks 5, 6, 18, 19 and 20, which lie along a scanning track or trace 21, is applied sequentially to the receiver 8. At the output of the receiver 8, are the signal voltages depicted in the plot diagrams of FIGS. 2.1, 2.2 and 2.3 and keyed to or associated with the respective register marks 5, 6, 18, 19 and 20. FIG. 2.1 shows the course of the signals at the output of the receiver 8 for the case wherein no filter 10, 14 is brought into the path of the light rays. In accordance with the colors of the register marks 5, 6, 18, 19 and 20, the amplitudes of the signals differ considerably from one another.

According to the invention, a filter 10, 14, which reduces the scatter width of the signal amplitudes, is brought into the path of the light rays. For the course of signals in FIG. 2.2, a filter 10 which reduces the signal amplitudes of the register marks 5 and 18 is disposed in the path of light rays. Starting from this scattering of the intensity maxima, the filter wheel 12, with the aid of the motor regulating or control circuit 17, is set into rotation via the transmission shaft 13, the transmission 15 and the drive 16 until a filter 14 is disposed in the path of rays and minimizes the intensity maxima, as is represented in the diagram of FIG. 2.3. This optimal filter 14 remains in the path of rays so as to take register deviation measurements and so as to actuate register adjustment devices.

I claim:

1. Method of scanning register marks produced in multicolor printing which includes generating signals by means of at least one photoelectric receiver from register marks which are applied in respective colors in a register mark track on a print carrier transportable past the receiver, the register marks differing sharply in contrast with the ink on the ink carrier, determining in a circuit arrangement amplitudes of the signals from the register marks, and bringing a filter arrangement into a radiation path between a light source and the receiver for contrast matching, and which comprises:

automatically bringing one defined color filter of the filter arrangement into the radiation path and, after scanning at least one group of register marks wherein all of the colors present in the print are contained, determining a scattering of intensity maxima of the signals generated from the register marks of the at least one group of register marks, automatically bringing another defined color filter of the filter arrangement into the radiation path and, after scanning at least one group of register marks wherein all of the colors present in the print are contained, determining a scattering of intensity maxima of the signals generated from the register marks of the at least one group of register marks, and bringing the defined color filter automatically into the radiation path which is capable of producing a minimal scattering of the intensity maxima of signals.

* * * * *